(12) United States Patent
Habedank

(10) Patent No.: US 6,340,208 B1
(45) Date of Patent: *Jan. 22, 2002

(54) MOTOR VEHICLE SEAT, IN PARTICULAR BACK SEAT

(75) Inventor: Klaus-Dieter Habedank, Stadthagen (DE)

(73) Assignee: Bertrand Faure Sitztechnik GmbH & Co. KG, Stadthagen (DE)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/213,586

(22) Filed: Dec. 17, 1998

(30) Foreign Application Priority Data

Dec. 18, 1997 (DE) .......................... 197 56 272

(51) Int. Cl.⁷ .................................. B60N 2/00
(52) U.S. Cl. ...................... 297/322; 297/340
(58) Field of Search ............ 297/340, 354.12, 297/322, 316, 341, 320

(56) References Cited

U.S. PATENT DOCUMENTS

| | | | |
|---|---|---|---|
| 4,616,874 A | * | 10/1986 | Pietsch et al. |
| 4,636,003 A | * | 1/1987 | Siebler |
| 5,358,308 A | * | 10/1994 | Judic et al. |

FOREIGN PATENT DOCUMENTS

| | | |
|---|---|---|
| DE | 19617401 | 11/1997 |
| FR | 2750085 | 12/1997 |
| GB | 2300352 | 11/1996 |

* cited by examiner

*Primary Examiner*—Milton Nelson, Jr.
(74) *Attorney, Agent, or Firm*—White & Case LLP

(57) ABSTRACT

A motor vehicle seat includes a seat frame which is pivotably coupled to a back rest. A tilt adjustment device has a first hinge portion secured to the back rest and a second hinge portion rigidly connected to the car body for tilting the back rest about a horizontal tilt axis which is located at a height greater than the horizontal pivot connecting the back rest to the seat frame. The forward portion of the seat frame is coupled to the car body such that the height and longitudinal position of the seat frame are adjustable. The horizontal pivot connecting the back rest to the seat frame is also adjustable in height and longitudinal position. In this manner, when the back rest is tilted, the seat portion is moved forward or back so that the hip joint location of the passenger remains substantially unchanged. Preferably, the front portion of the seat frame is coupled to a support region that is fixed relative to the car body by an adjustable length connecting linkage, so that the tilt angle of the seat can be adjusted independent of the tilt mechanism for the back rest.

10 Claims, 12 Drawing Sheets

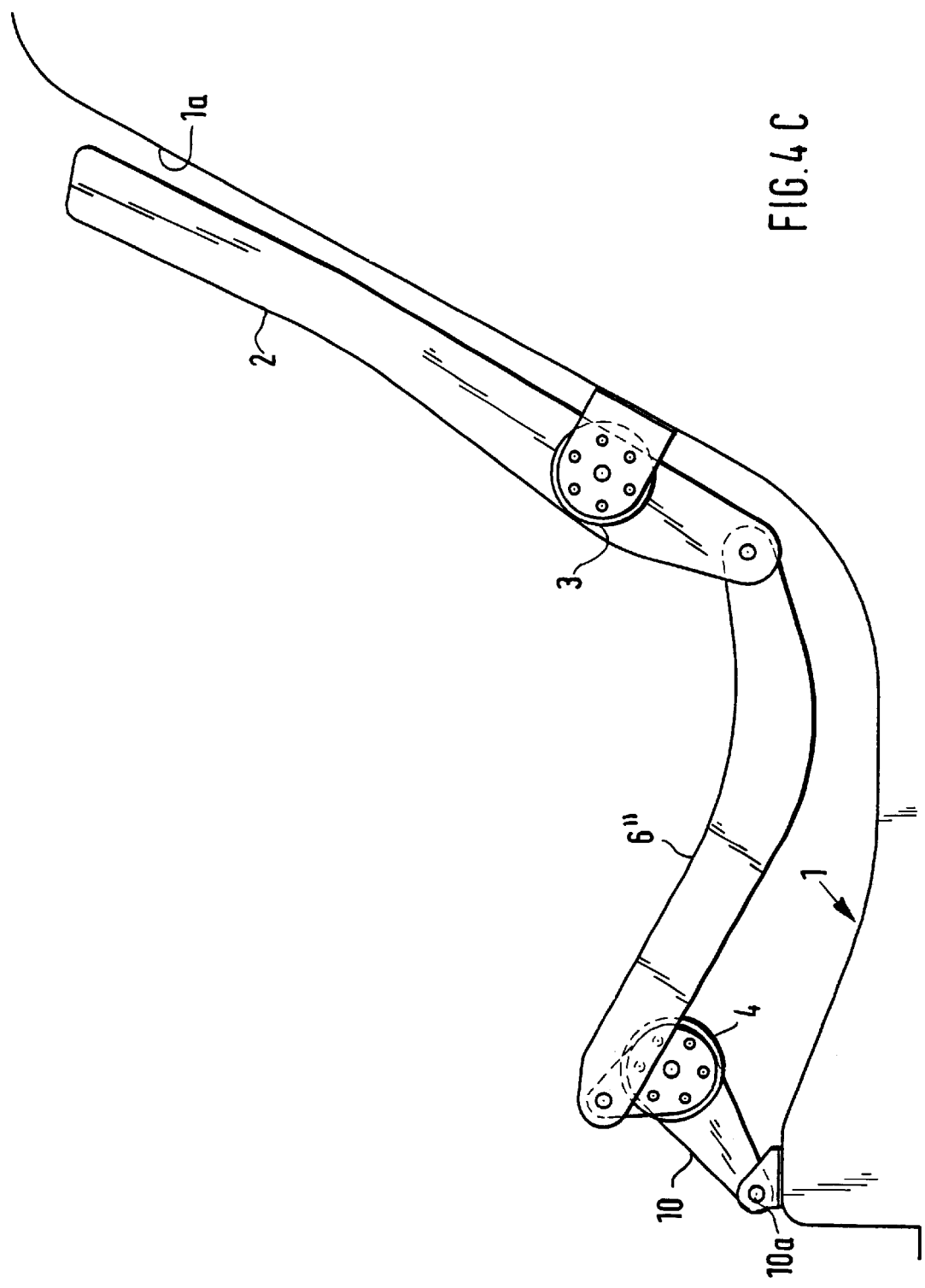

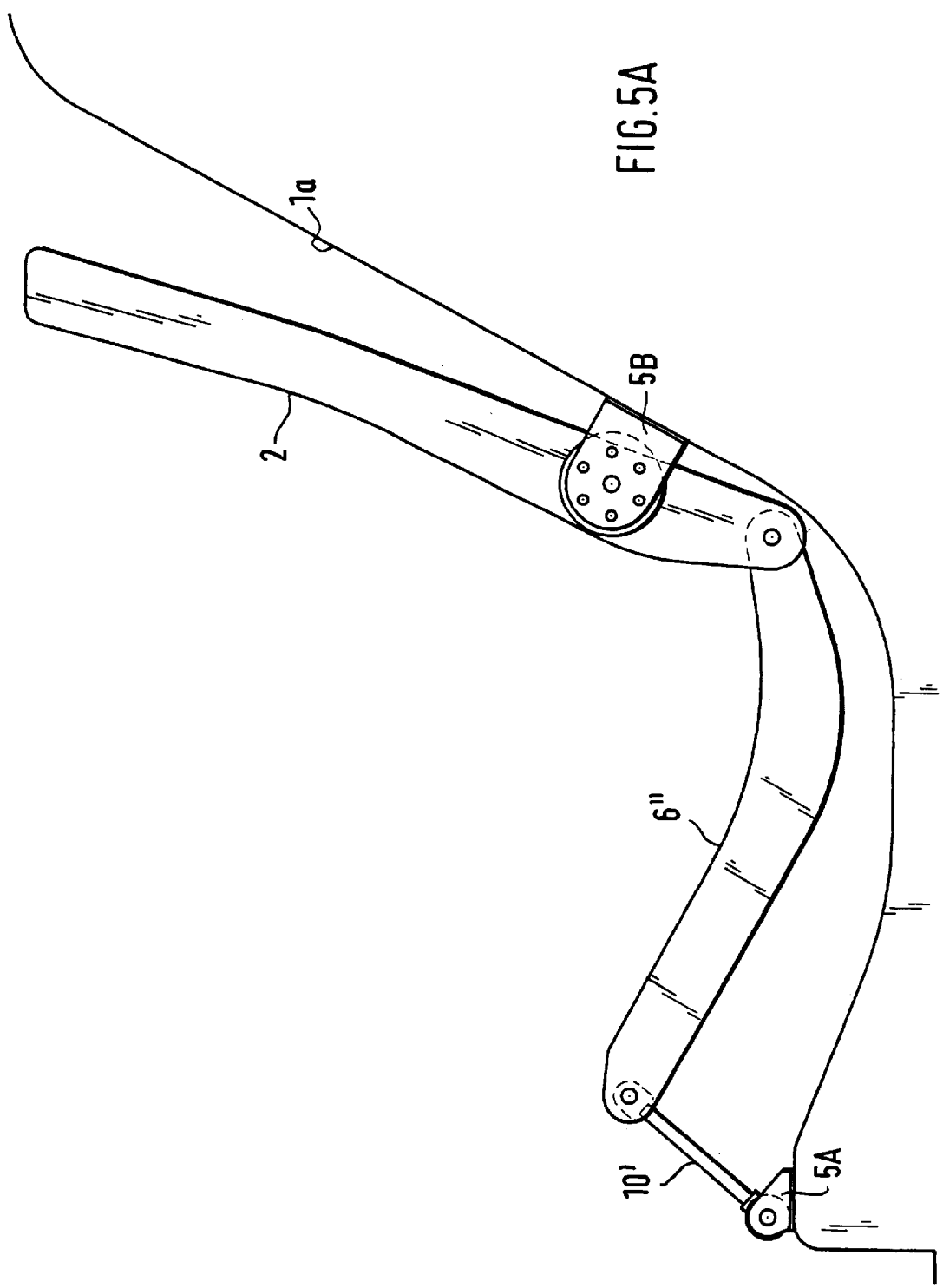

MOTOR VEHICLE SEAT, IN PARTICULAR BACK SEAT

BACKGROUND OF THE INVENTION

The present invention relates to motor vehicle seats with a seat portion whose front edge can be raised, and a back rest whose upright position can be adjusted. This invention has particular application to automobile back seats, but may be used with other motor vehicle seats if desired.

U.K. patent application No. 2,300,352 discloses a motor vehicle seat in which the back rest pivots around a horizontal pivot tilt at the lower end of the back rest. The angle of pivot is determined by a clutch device, arranged in the upper region of the seat back, that makes it possible to lock the back rest in two different positions relative to the automobile car body. The back rest can also be decoupled from the car body and folded forward in order to provide increased cargo area in the trunk. When the angle of the back rest is changed, the seat portion is not adjusted, so that the available surface area of the seat portion changes depending on the tilt of the back rest. This means that, when the back rest is tilted, the position where the passenger's hip joint should be located in the seat moves in both the horizontal and vertical directions, requiring that passengers reposition themselves.

French patent publication No. 2,750,085 discloses a motor vehicle seat whose seat portion is guided in the longitudinal direction along a curved guide that is fixed relative to the car body. The back rest is split such that, by means of a lever bar, which is moved together with the entire seat, the upper portion of the back rest is swiveled as the seat is moved longitudinally, so that the curvature of the back rest is changed. When the back rest tilt of the entire seat back changes, the hip joint location moves as well.

German patent publication No. DE 196 17 401 discloses a motor vehicle seat having a seat frame and seat cushion. The seat portion has a tilt adjustment mechanism which allows the seat portion to be inclined in such a way that the hip joint location changes by only a small amount. For this purpose, the seat cushion is coupled to the seat frame in such a way that the swivel axis of the tilt-adjustable seat portion is located beneath the hip joint location, at the shortest possible distance from it. However, as in other prior art mechanisms, the hip joint location moves when the back rest is tilted.

An adjustment device in which the angle of the back rest can be continuously adjusted, relative to the seat portion, is disclosed in U.S. Pat. No. 4,668,013. Two hinge portions, one of which is attached to the seat portion and the other of which is attached to the back rest, are connected through a planetary gear train. More particularly, one hinge portion has a pair of coaxial sun gears, i.e., gears with internally facing gear teeth, of differing diameters. The other hinge portion has a corresponding pair of planet gears, i.e., gears with externally facing gear teeth. Each planet gear has a slightly smaller outer diameter, and one less gear tooth, than the corresponding sun gear. The planet gears are eccentrically mounted relative to the sun gears on a common crank, so that the upon rotation of the crank, which is done by rotating an adjustment knob, the planet gears move in an orbital path relative to the sun gears. Due to the fact that each planet gear has one less gear tooth than the corresponding sun gear, the orbital motion of the planet gears, caused by rotating the knob, causes a small amount of rotation between the two hinge portions, thereby changing the tilt angle of the back rest.

SUMMARY OF THE INVENTION

The present invention is a motor vehicle seat having a back rest whose tilt angle can be adjusted in such a way that the hip joint location remains substantially unchanged. The seat portion may also be tilted, by raising its front edge, independently of the back rest tilt adjustment.

More particularly, a motor vehicle seat according to the invention includes a seat frame which is pivotably coupled to a back rest. A tilt adjustment device has a first hinge portion secured to the back rest and a second hinge portion rigidly connected to the car body for tilting the back rest about a horizontal tilt axis. The tilt adjustment mechanism is located at a height greater than the horizontal pivot connecting the back rest to the seat frame. The forward end of the seat frame is coupled to the car body such that the height and longitudinal position of the seat frame forward end are adjustable. Also, the horizontal pivot of the back rest is adjustable in height and longitudinal position. In this manner, when the back rest is tilted, the seat portion is moved forward or back so that the hip joint location of the passenger, relative to the seat portion, remains substantially unchanged.

Preferably, the forward end of the seat frame is coupled to a support region that is fixed relative to the car body by an adjustable length connecting linkage, so that the tilt angle of the seat can be adjusted independent of the tilt mechanism for the back rest.

As a result of coupling the seat portion to the back rest, the exposed seat area remains unchanged relative to the body of the user when the back rest is adjusted. The position of the passenger's back also remains unchanged relative to the back rest, as the back rest is tilted, so that the back rest continues to support the back properly.

In one embodiment, all of the seat elements are arranged on a base frame, such that the seat is a modular unit which can easily be installed in a car body. A subframe may also be employed, which permits horizontal and vertical adjustment movement of the seat frame to be separated so that it is possible to compensate fully, or at least substantially, for the shift in the hip joint location caused by adjustment of the back rest. Adjustment of the seat tilt is possible independent of this compensation.

Adjustment of seat tilt is accomplished by means of a swivelling lever mechanism located at a forward region of the seat portion. The swivelling lever mechanism is designed with two lever members, and a rotational adjustment mechanism is inserted between the two levers. Adjustment of the seat tilt can alternately be achieved by means of a single, adjustable length swivelling lever.

For a better understanding of the invention, reference is made to the following detailed description of a preferred embodiment, taken in conjunction with the drawings accompanying the application.

BRIEF DESCRIPTION OF THE DRAWINGS

FIG. 4c is a schematic side view of the fourth embodiment, with the seat frame raised in front;

FIG. 5a is a schematic side view of the fifth embodiment, with the seat frame raised in front as compared with FIG. 5;

DETAILED DESCRIPTION OF PREFERRED EMBODIMENTS

Figure 1:
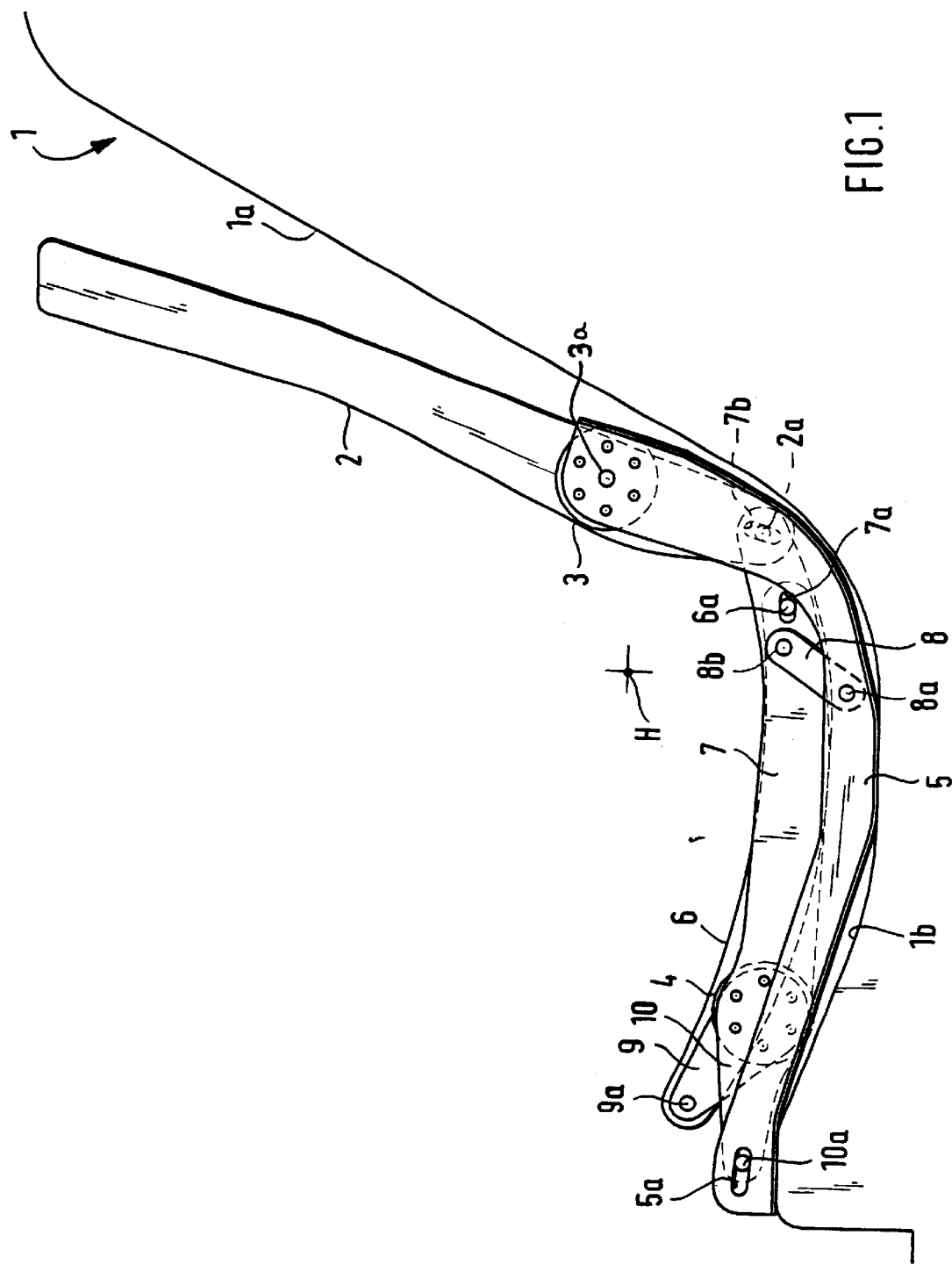
FIG. 1 is a schematic side view of a first embodiment of the invention.

In the drawings, the same or corresponding parts are labeled with the same reference symbols, which are distinguished from one another by prime symbols where appropriate.

FIG. 1 shows in schematic form an automobile car body 1 having a rear panel 1a and a floor 1b forming part of a passenger compartment. A base frame 5 is attached to the floor 1b of the car and supports a seat portion 6 and a back rest 2, as described below.

A tilt adjustment mechanism 3 includes a pair of hinge parts which are mutually rotatable about a pivot shaft 3a, on which an adjustment knob, which is omitted for clarity, is mounted. Adjustment mechanisms 3 for pivoting a back rest 2 are well known, for example as disclosed in U. S. Pat. No. 4,668,013, the disclosure of which is incorporated herein by reference. As described above, in such a mechanism pivot shaft 3a is a crank, on which one or more planet gears are eccentrically mounted relative to one or more sun gears, so that rotation of shaft 3a, which occurs upon rotation of the adjustment knob, causes a small amount of rotation between the planet and sun gears, thereby changing the angle between the hinge parts. Because such mechanisms are known and have been commercially utilized in automobiles, it need not be described further here. The type of adjustment device 3 used is not important and any suitable mechanism may be used.

One hinge part of the adjustment device 3 is permanently attached to the back rest 2, preferably by being secured to part of the back rest frame. The other hinge part of the adjustment device 3 is permanently attached to the base frame 5 so as to be rigidly connected to the vehicle body 1. The forward end of the base frame 5 includes slots 5a (one of which is shown, the other slot 5a being located on the opposite side of the seat portion 6), which are substantially horizontal, and which accommodate articulated lever pins 10a.

The base frame 5 is coupled to a subframe 7 by a connecting rod 8. Preferably, there is a subframe 7 and connecting rod 8 on the side of the seat frame 6 as well, whose opposite ends are rotatably mounted, through connecting rod pins 8a and 8b, to the base frame 5 and the subframe 7, respectively. The forward end of the subframe 7 is rigidly connected to a second articulated lever 10, whose articulated lever pin 10a is carried in a slideable manner in the horizontal slot 5a.

The back rest 2 is connected to the subframe 7 through a bearing journal 2a which is received in a slot 7b in the subframe 7. Due to the orientation of the slot 7b, during adjustment of the back rest, when the bearing journal 2a rotates about the axis 3a, only the horizontal component of movement of the bearing journal 2a is transmitted to the subframe 7.

The first articulated lever 9 is connected to the second articulated lever 10 by a self-locking rotational adjustment mechanism 4. Adjustment mechanism 4 may be similar to the tilt adjustment mechanism 3, in that it permits the passenger to adjust the rotational angle between levers 9 and 10, e.g., by rotating an adjustment knob, but provides a rigid coupling between the levers 9 and 10 when not being adjusted. The lever 9 is pivotably coupled to the seat frame 6 by a lever pin 9a. The adjustment mechanism 4 permits tilt adjustment of the seat frame 6 independent of the back rest 2.

The rear portion of the seat frame 6 is supported by the subframe 7 by way of a bearing journal 6a received in a slot 7a in the subframe 7. As a result, the subframe 7 remains unaffected when the tilt adjustment mechanism 4 is operated to tilt the seat frame 6.

When the tilt adjustment mechanism 3 is operated to recline the back rest 2 toward the frame 1a, the back rest 2 rotates about the axis 3a. Because the axis 3a is higher than the bearing journal 2a, the bearing journal 2a moves along an arc centered about the axis 3a and thereby moves in a forward and upward direction. Forward movement of the journal 2a pushes the subframe 7 forward, so that connecting rod 8 rotates counterclockwise about the axis of the connecting rod pin 8a. The connecting rod pin 8b, and thereby the back end of the subframe 7, move along an arcuate path in a generally forward direction. As this occurs, journal 2a is able to slide within the inclined slot 7b. At the forward end of the seat, the lever pin 10a slides forward in the slot 5a.

Because the seat frame 6 is coupled to the subframe 7 through the lever 9, it moves forward with the subframe 7 as the back rest 2 tilts back. As a result, the hip joint location "H" remains generally in the same position relative to the seat frame 6. In other words, because the seat frame 6 moves forward as the lower end of the back rest 2 moves forward, the passenger's body will rotate generally about the location "H", and the passenger will not need to reposition himself or herself for proper seat support.

When the seat adjustment mechanism 4 is operated, the lever 9 rotates relative about the axis of the adjustment mechanism 4 relative to the lever 10 (which is fixed relative to the subframe 7), thereby raising the front edge of the seat. The rear portion of the seat frame 6 rotates about the journal 6a. The slot 7a allows longitudinal movement between the journal 6a and the subframe 7, to accommodate the component of longitudinal movement caused by the arcuate movement of the lever 9.

Figure 2:
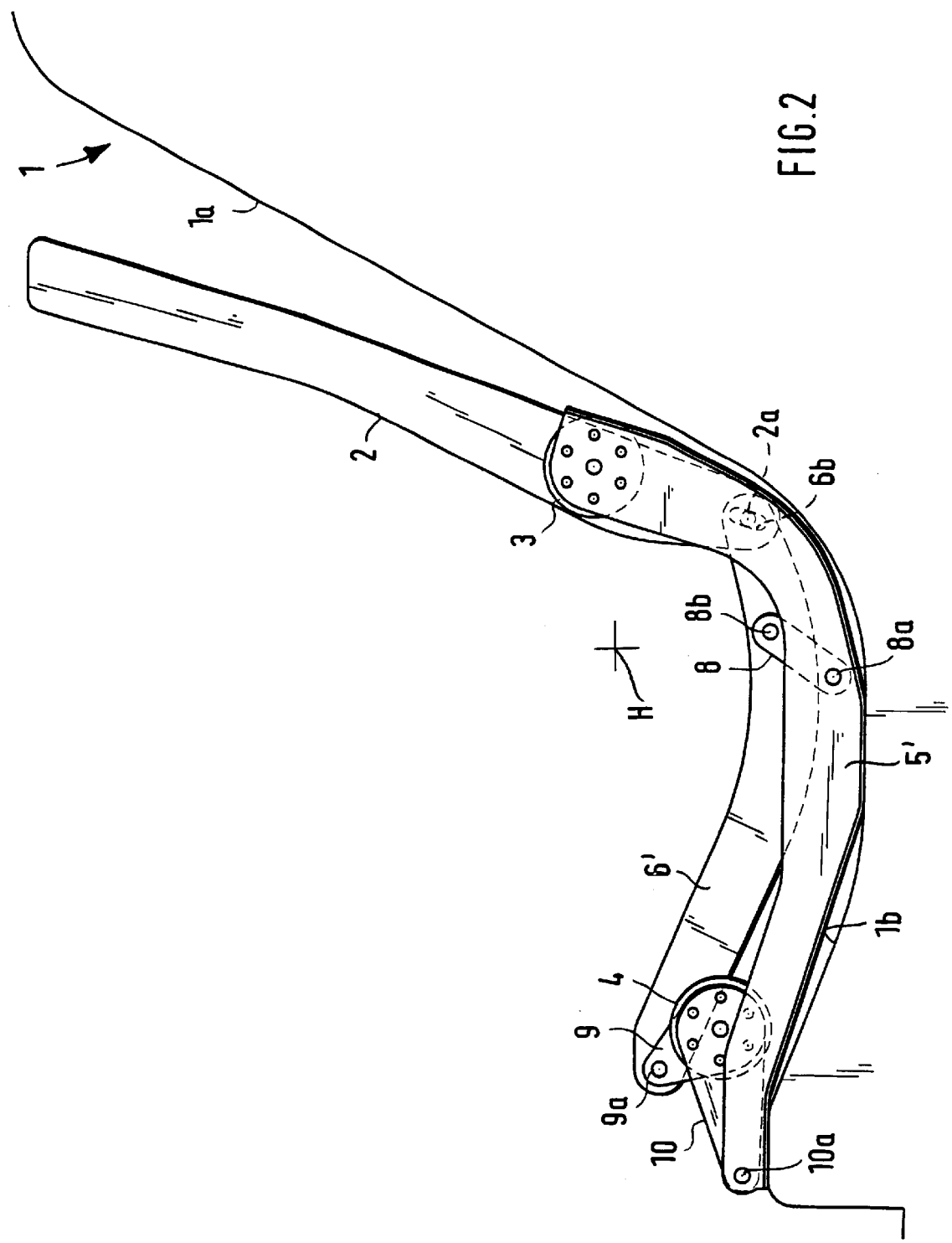
FIG. 2 is a schematic side view of a second embodiment of the invention.

The motor vehicle seat shown in FIG. 2 does not include a subframe and functions with a base frame 5' and a seat frame 6'. The back rest 2 is adjustable via the tilt adjustment mechanism 3, which is connected between the base frame 5 and the back rest 2. The back rest 2 is directly connected to the seat frame 6' by means of a bearing journal 2a which is received in a slot 6b in the seat frame 6'. The base frame 5' is connected via a connecting rod 8 to the seat frame 6' by way of connecting rod pins 8a and 8b. In this embodiment, the articulated lever pin 10a in the articulated lever 10 of the rotational adjustment mechanism 4 is supported in the base frame 5' so as to be rotatable but not slideable. During operation of the adjustment mechanism 4, both levers 9 and 10 pivot.

Figure 3:
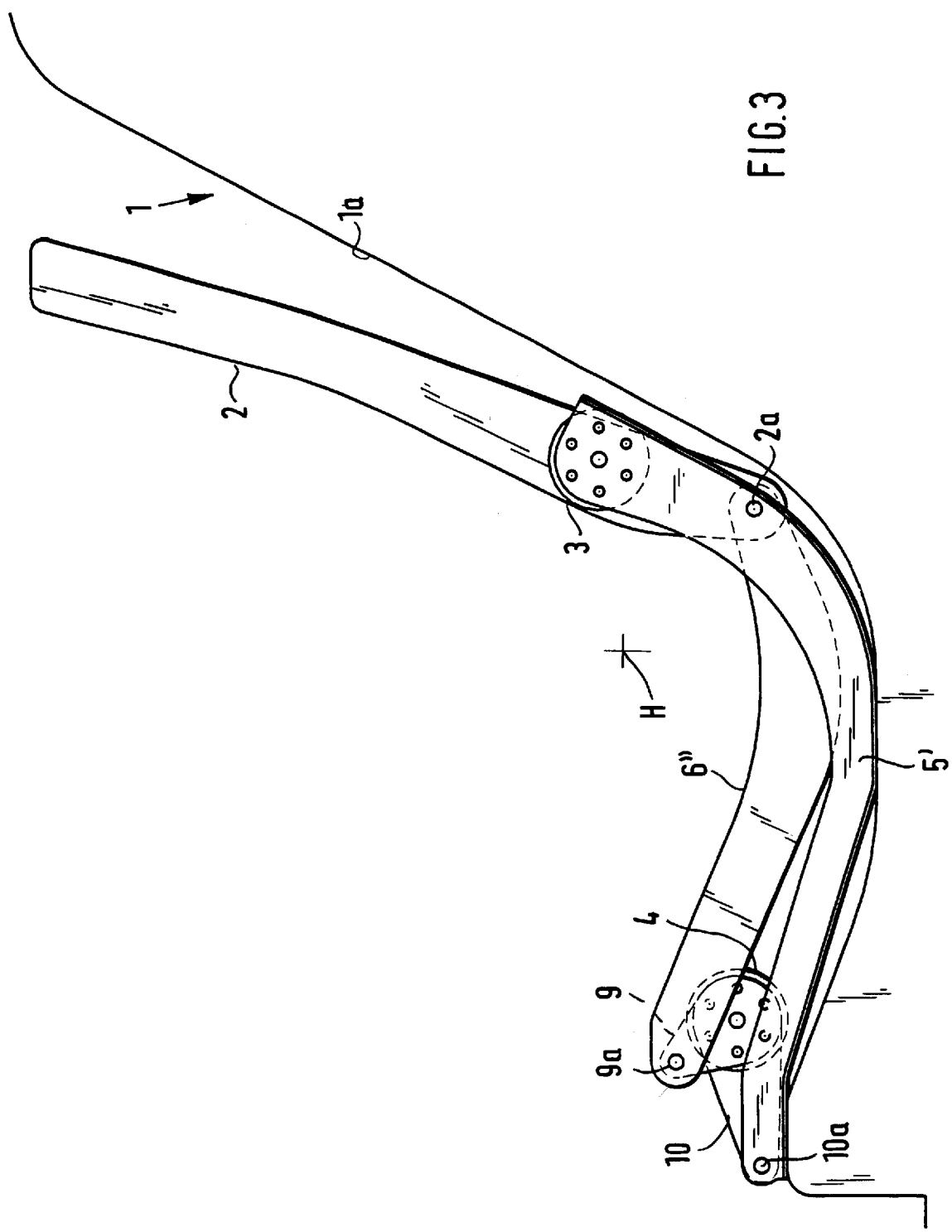
FIG. 3–3A is a schematic side view of a third embodiment of the invention.

A further simplification of the seat is shown in FIG. 3. The two articulated levers 9 and 10 of the rotational adjustment mechanism 4 are the same as in FIG. 2. The seat frame 6" is connected to the back rest 2 via bearing journal 2a in a rotatable, but not slideable, manner. As a result, coupling of the seat frame 6" to the base frame 5' via connecting rods can be omitted.

Figure 3A:
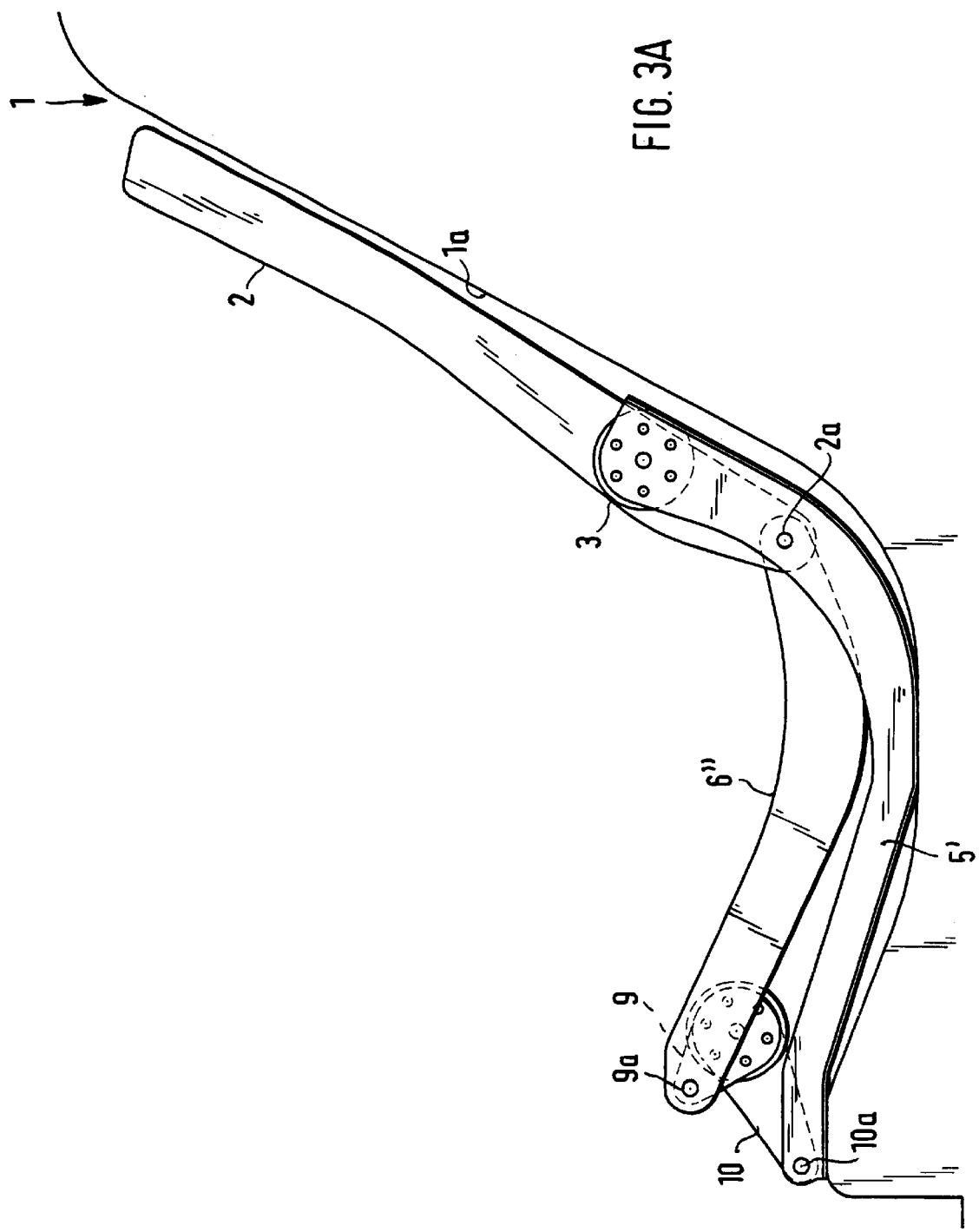

FIG. 3 shows the motor vehicle seat with the back rest 2 inclined forward. FIG. 3a shows the same seat but with the back rest 2 inclined all the way back. The seat 6" is pushed forward via the bearing journal 2a, and the second articulated lever 10 rotates about the articulated lever pin 10a counterclockwise with respect to the frame 5'. Rotation of lever 10 causes the adjustment mechanism 4 and lever 9 also to rotate about the lever pin 10a as a unit, thereby raising the front of the seat slightly as shown. The front end of the seat can be further raised, if desired, by operating the adjustment mechanism 4.

Figure 4:
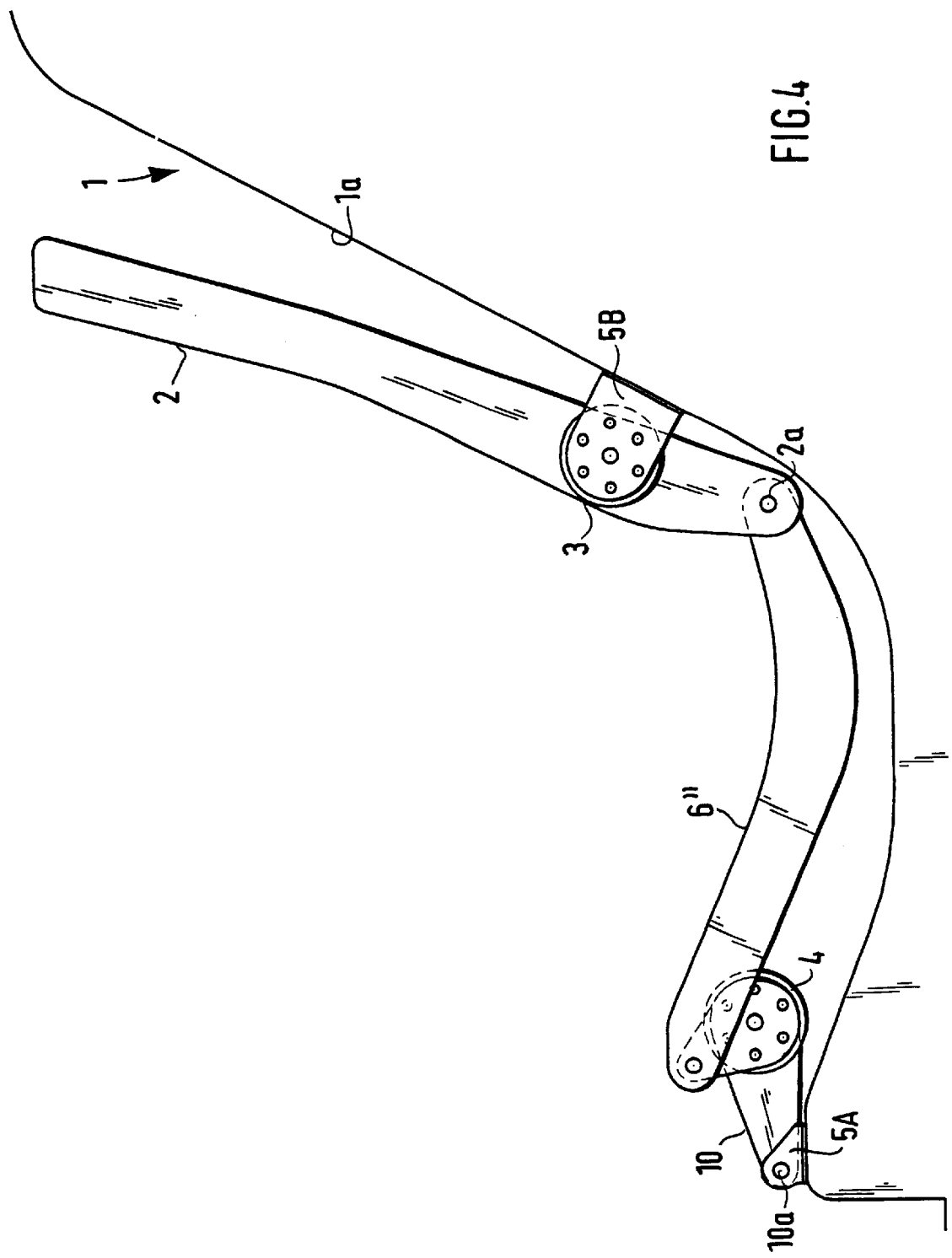
FIG. 4 is a schematic side view of a fourth embodiment of the invention.

The embodiment shown in FIG. 4 does not employ either a base frame or a subframe. One of the hinge portions of the tilt adjustment mechanism 3 for the back rest 2 is attached directly to the car body 1 in the trunk region 1a via a bracket 5B. The articulated pin 10a of the second articulated lever 10, which lever 10 is rigidly attached to one hinge of the rotational adjustment mechanism 4, is supported in a support region 5A that is fixed with respect to the car body 1 and designed as a support bearing.

Figure 4A:
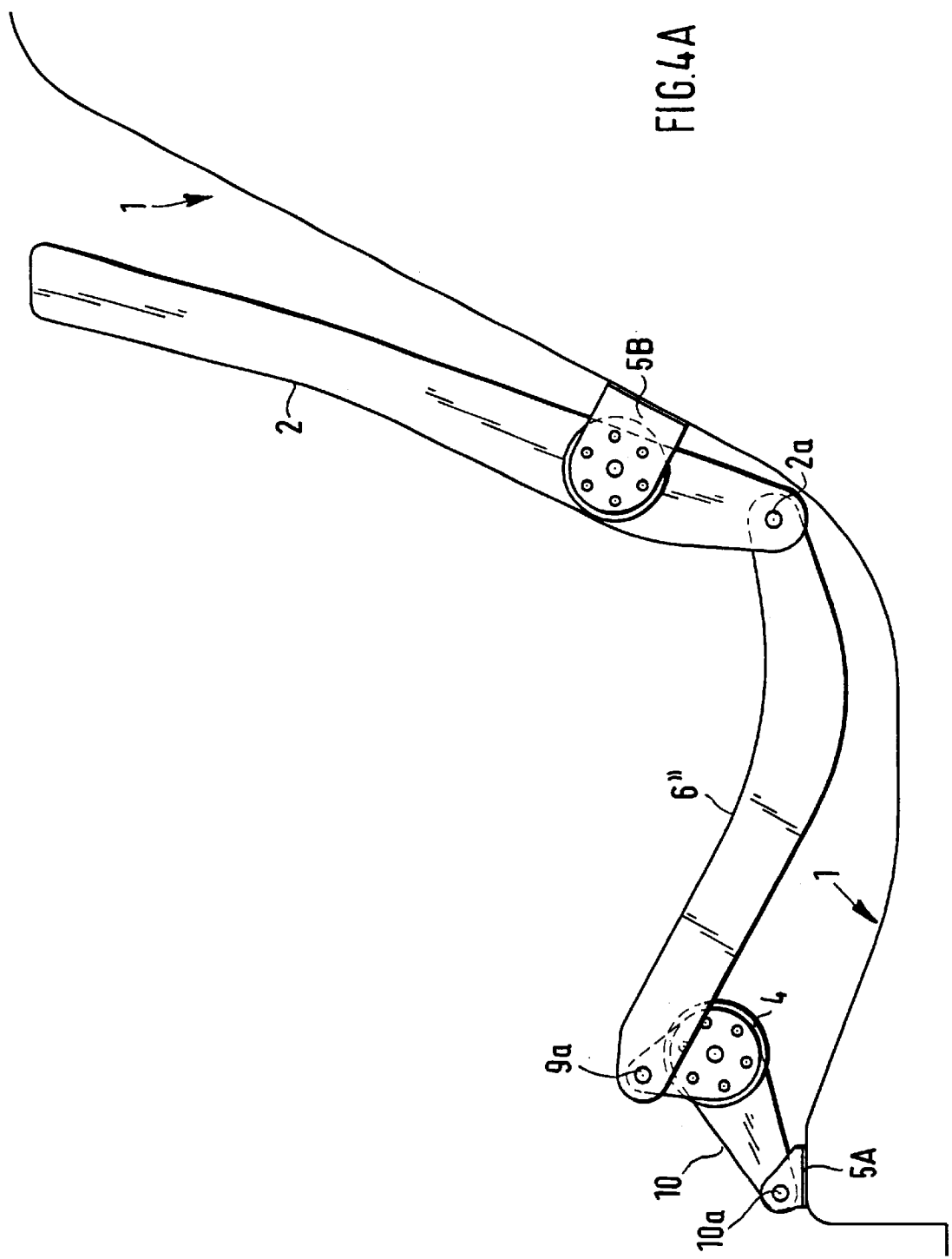
FIG. 4a is a schematic side view of the fourth embodiment, with the seat portion raised as compared with FIG. 4.

FIG. 4a shows the operation of the front tilt adjustment mechanism 4. By actuating mechanism 4, e.g., by rotating a knob (not shown), the angle between the levers 9 and 10 is increased, thereby increasing the distance between the lever pins 9a and 10a and raising the front edge of the seat. During this process, the articulated lever pins 9a and 10a rotate in their respective supports. The tilt of the back rest 2 remains unaffected by this adjustment.

Figure 4B:
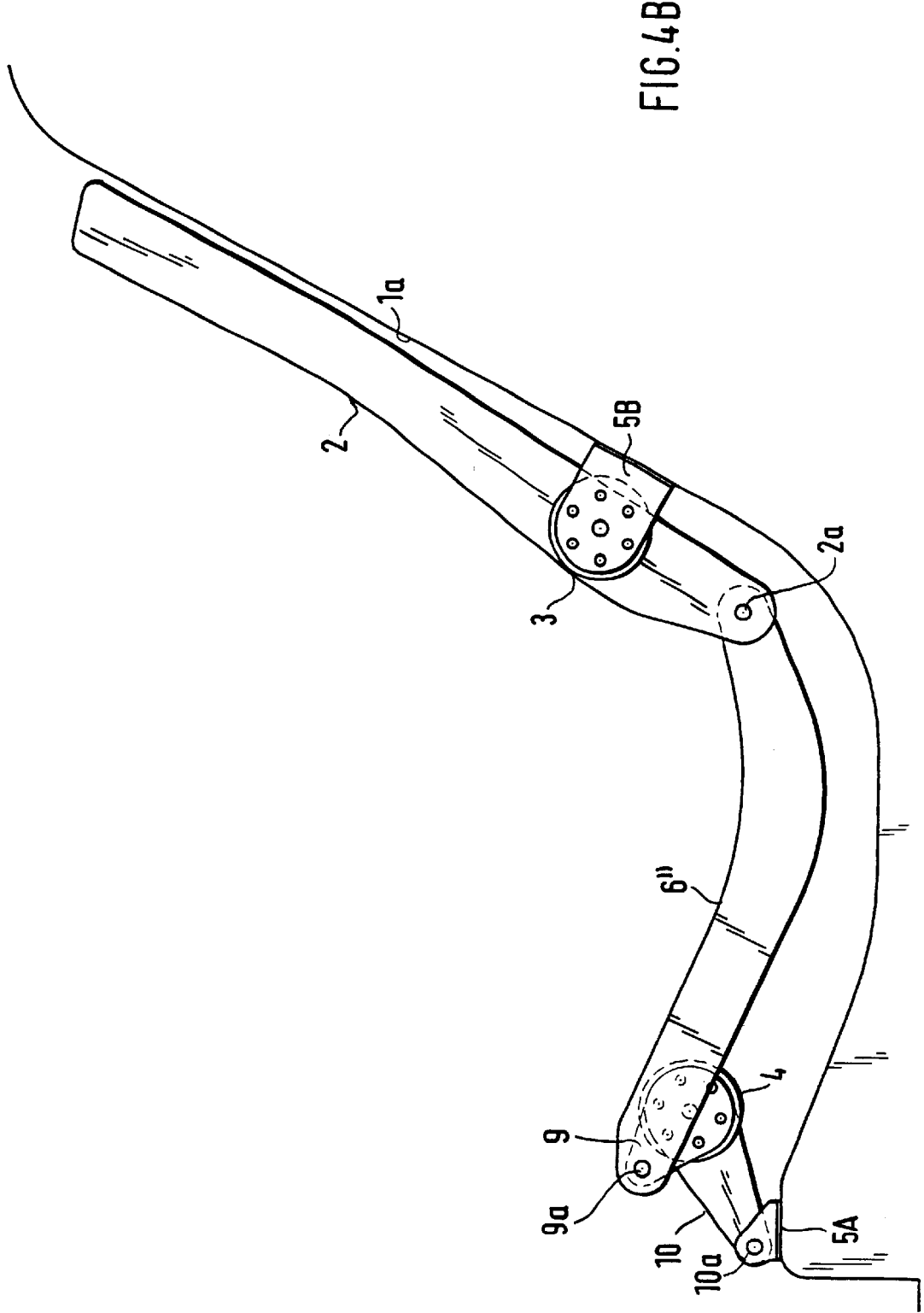
FIG. 4b is a schematic side view of the fourth embodiment, with the back rest tilted back as compared with FIG. 4.

In FIG. 4b, the front tilt adjustment mechanism 4 has the same setting as in FIG. 4. The back rest 2, however, has been tilted back, by means of the tilt adjustment mechanism 3, to a position parallel to the car body rear panel 1a. As a result, the seat frame 6" has moved forward. During this process, the first articulated lever 9 and the second articulated lever 10 have rotated around their lever pins 9a, 10a so that the front edge of the seat is raised. As a result of the rotating connection between the back rest 2 and the seat frame 6", by means of bearing journal 2a, the rear edge of the seat frame 6" has also been raised during back rest adjustment so that the hip joint location has remained nearly unchanged as compared with FIG. 4.

In FIG. 4c, the front tilt adjustment mechanism has been operated to raise the front edge of the seat frame 6". As FIG. 4c illustrates, the front tilt adjustment mechanism 4 remains fully functional even with the back rest 2 reclined as in FIG. 4b.

Figure 5:
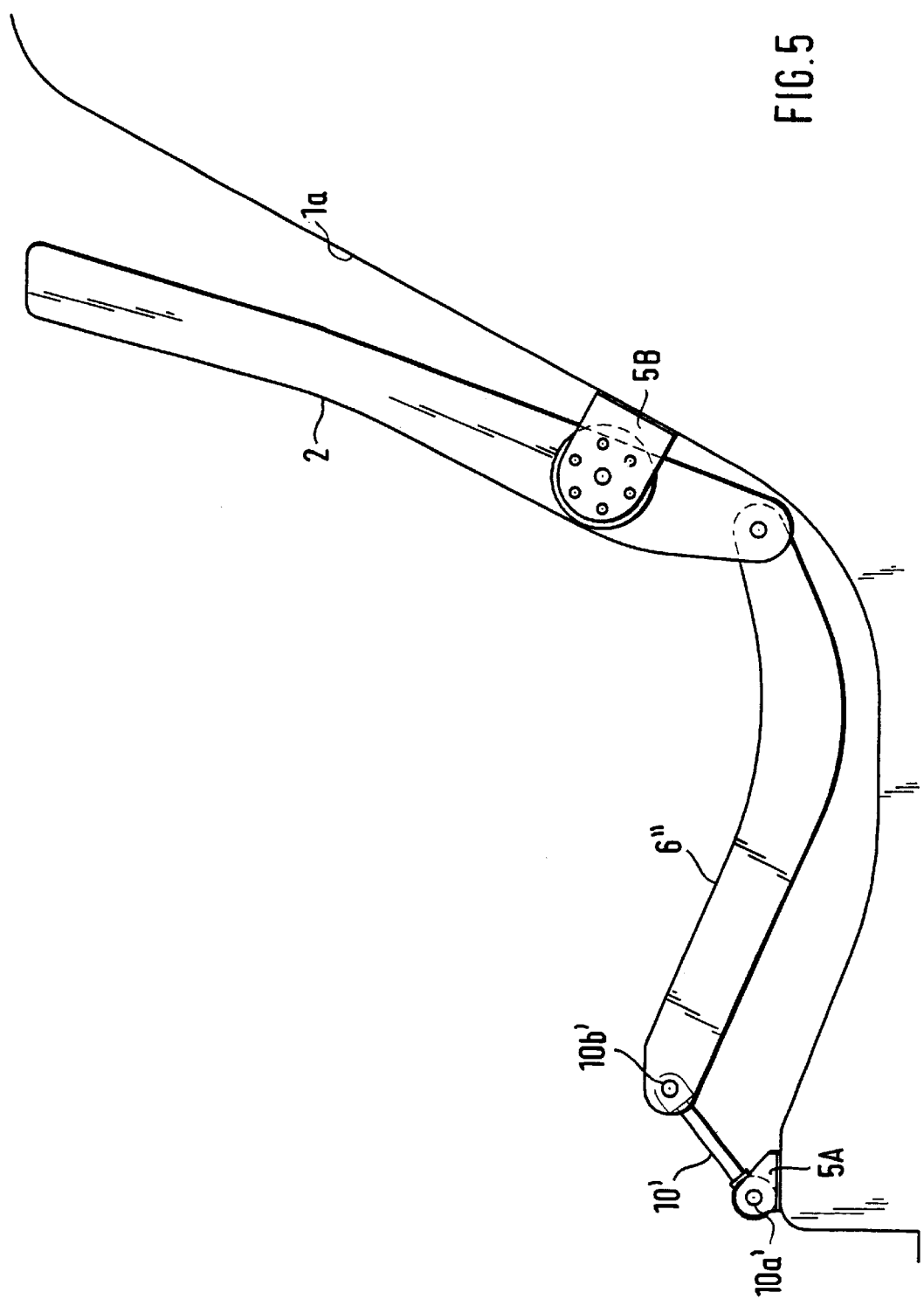
FIG. 5 is a schematic side view of a fifth embodiment of the invention.
Figure 5B:
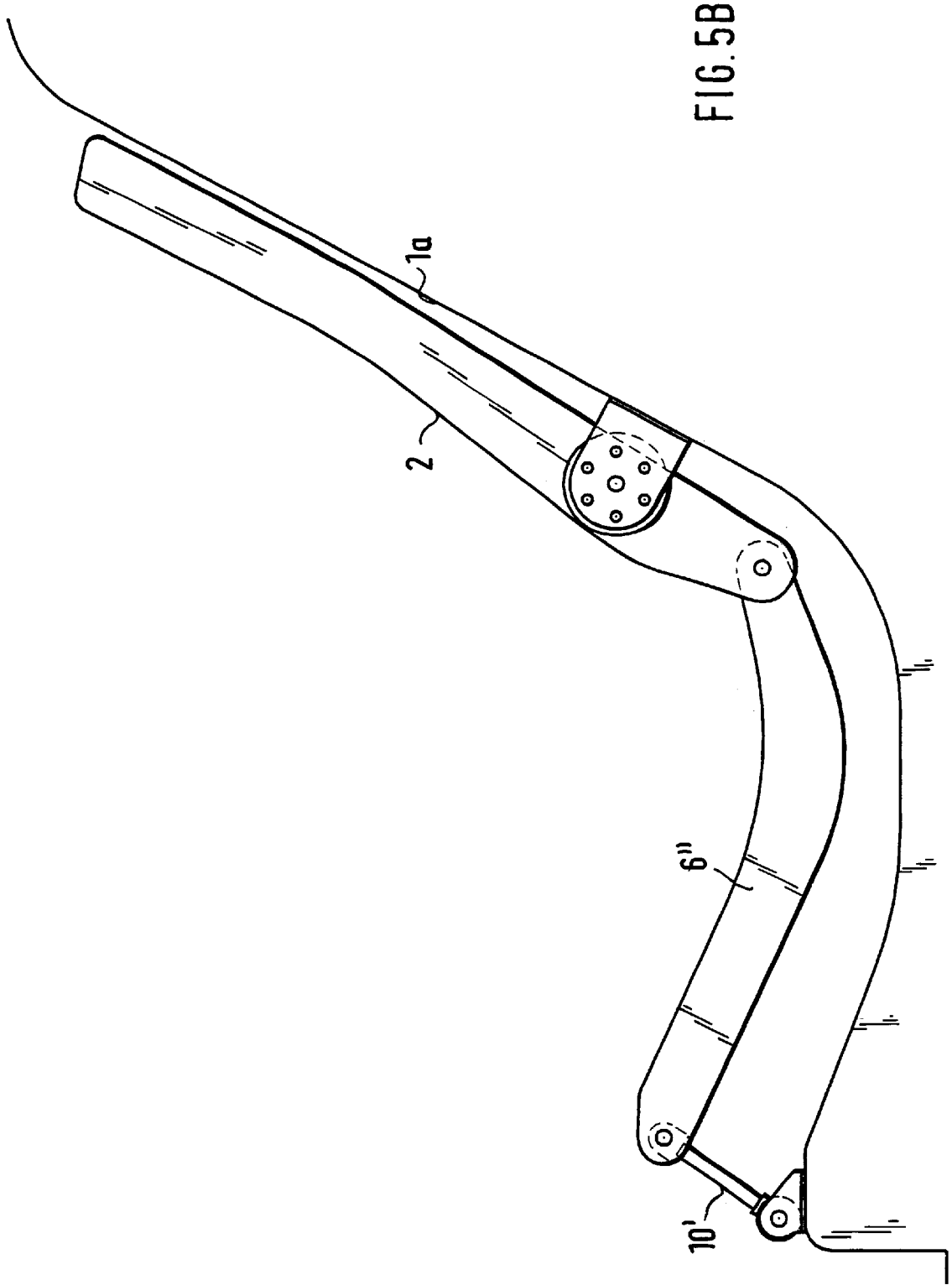
FIG. 5b is a schematic side view of the fifth embodiment, with the back rest tilted back as compared with FIG. 5.
Figure 5C:
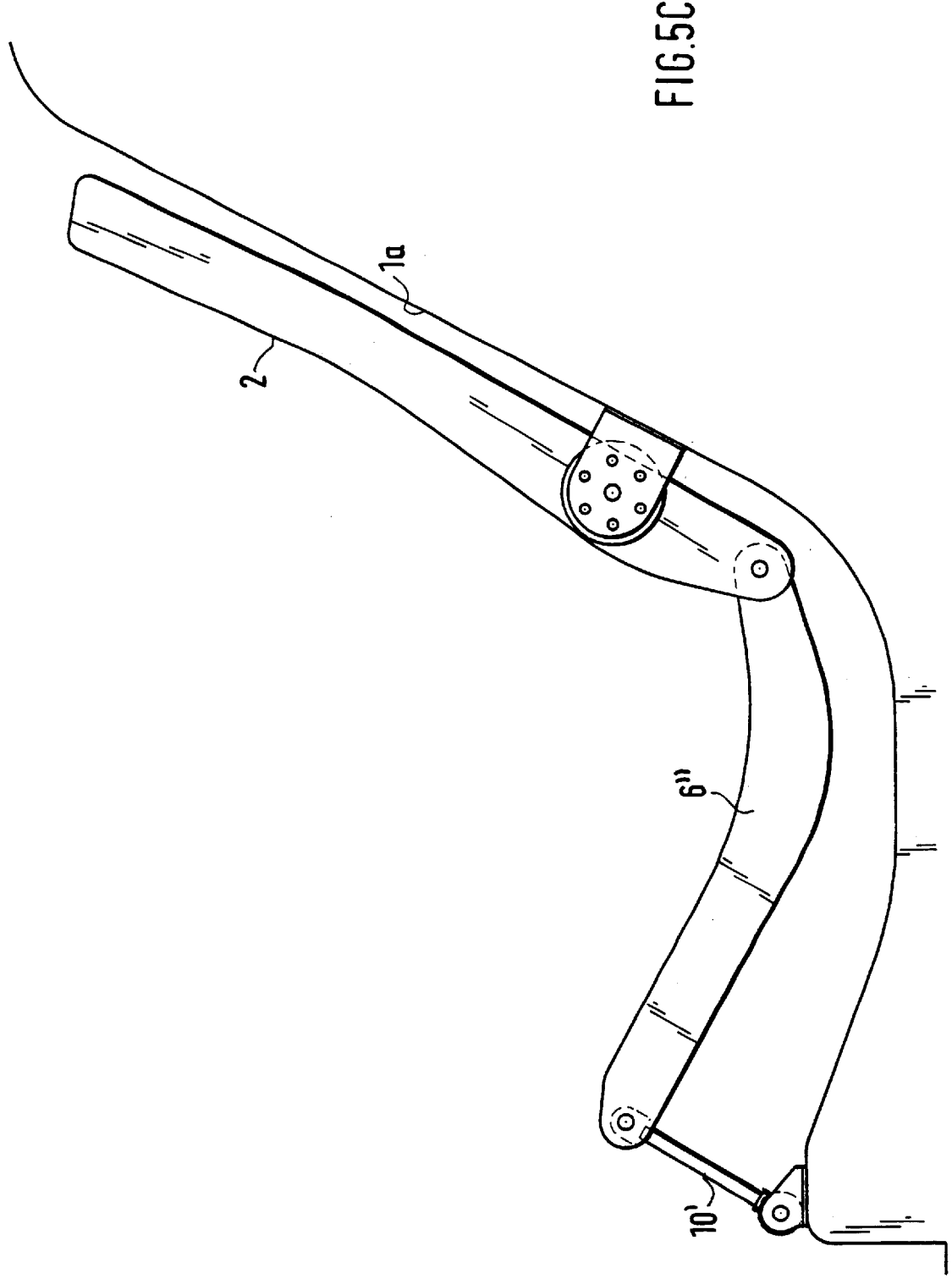
FIG. 5c is a schematic side view of the fifth embodiment, with the back rest tilted back and the seat frame raised in front.

FIG. 5 shows the support of the back rest 2 with a bracket 5B as in FIG. 4. The support bearing associated with the support region 5A that is fixed with respect to the car body 1 also corresponds to FIG. 4. By means of an articulated lever pin 10a', an adjustable length articulated lever 10' is pivotably mounted to the support region 5A. The articulated lever 10' is attached to the seat frame 6" by means of a journal 10b'. Extending the articulated lever 10' changes the tilt angle of the seat frame 6", as shown in FIG. 5a. The tilt adjustment of the back rest 2 causes pivoting of the articulated lever 10' about its articulated lever pin 10a', where the seat frame 6" is moved forward and raised as a whole, as can be seen in FIG. 5b. Finally, FIG. 5c shows the tilt adjustment of the seat frame 6" through the extension of the articulated lever 10' with the back rest 2 at the same tilt position as in FIG. 5b.

The foregoing represents preferred embodiments of the invention. Variations and modifications will be apparent to persons skilled in the art, without departing from the inventive concepts disclosed herein. For example, while preferred embodiments have been described with reference to a back seat of an automobile, the invention may be employed in the front seats as well, or in other types of motor vehicles. All such modifications and variations are intended to be within the skill of the art, as defined in the following claims.

What is claimed is:

1. A seat for a motor vehicle comprising:
   a seat frame;
   a back rest having a forward portion and a rear portion, wherein the back rest is pivotably coupled to the seat frame about a first horizontal pivot, and the first horizontal pivot is located at the lower end on the back rest;
   a tilt adjustment device for tilting the back rest about a horizontal tilt axis, wherein the horizontal tilt axis is located at height greater than the first horizontal pivot, and the tilt adjustment device has a first hinge portion secured relative to the back rest and a second hinge portion that is capable of being connected to a motor vehicle body,
   wherein the first horizontal pivot rotates about the horizontal tilt axis in response to the tilting movement of the back rest, and
   wherein a forward portion of the seat frame is capable of being coupled to the motor vehicle body such that the height and longitudinal position of the seat frame are adjustable, and the first horizontal pivot is also adjustable in height and longitudinal position.

2. The seat according to claim 1 further comprising a connecting linkage for coupling the forward portion of the seat frame to a support region that is fixed relative to the motor vehicle body.

3. The seat according to claim 2, wherein the connecting linkage is adjustable in length.

4. The seat according to claim 3, wherein the connecting linkage has first and second articulated levers that can be swiveled relative to one another by way of a rotational adjustment mechanism having a pair of hinge members adjustable about a horizontal axis of rotation, the first hinge member being rigidly connected to the first articulated lever and the second hinge member being rigidly connected to the second articulated lever, wherein the first articulated lever is coupled to the seat frame and the second articulated lever is capable of being coupled to the support region.

5. The seat according to claim 3, wherein the connecting linkage comprises an adjustable length articulated lever, one end of which is coupled to the forward portion of the seat frame and the other of which is capable of being coupled to the support region.

6. The seat according to claim 1, wherein the back rest is coupled to the seat frame by means of a common bearing journal located on the back rest.

7. A motor vehicle seat comprising:
   a base frame having a longitudinal axis;
   a seat frame;
   a back rest having a forward portion and a rear portion, the back rest pivotably coupled to the seat frame about a first horizontal pivot, wherein the horizontal pivot is located at the lower end on the back rest; and
   a tilt adjustment device for tilting said back rest about a horizontal axis, wherein the horizontal tilt axis is located at a height greater than the first horizontal pivot, and the tilt adjustment device has a first hinge portion secured related to the back rest and a second hinge portion rigidly connected to the base frame,
   wherein the first horizontal pivot rotates about the horizontal tilt axis in response to the tilting movement of the back rest, and wherein a forward portion of the seat frame is coupled to the base frame such that the height and longitudinal position of the seat frame are adjustable, and the first horizontal pivot is also adjustable in height and longitudinal position.

8. A motor vehicle seat comprising:

a seat frame;

a back rest having a forward portion and a rear portion, wherein the back rest is pivotably coupled to the seat frame about a first horizontal pivot;

a tilt adjustment device for tilting the back rest about a horizontal tilt axis, wherein the horizontal tilt axis is located at a height greater than the first horizontal pivot, and the tilt adjustment device has a first hinge portion secured relative to the back rest and a second hinge portion that is capable of being connected to a motor vehicle body; and a connecting linkage that is adjustable in length for coupling the forward portion of the seat frame to a support region that is fixed relative to the motor vehicle body, wherein the first horizontal pivot rotates about the horizontal tilt axis in response to the tilting movement of the back rest, and wherein a forward portion of the seat frame is capable of being coupled to the motor vehicle body such that the height and longitudinal position of the seat frame are adjustable, and the first horizontal pivot is also adjustable in height and longitudinal position.

9. A motor vehicle seat comprising:

a seat frame;

a back rest having a forward portion and a rear portion, wherein the back rest is pivotably coupled to the seat frame about a first horizontal pivot;

a tilt adjustment device for tilting the back rest about a horizontal tilt axis, wherein the horizontal tilt axis is located at a height greater than the first horizontal pivot, and the tilt adjustment device has a first hinge portion secured relative to the back rest and a second hinge portion that is capable of being connected to a motor vehicle body; and a connecting linkage that is adjustable in length for coupling a forward portion of the seat frame to a support region that is fixed relative to the motor vehicle body, wherein the connecting linkage has first and second articulated levers that can be swiveled relative to one another by way of a rotational adjustment mechanism having a pair of hinge members adjustable about a horizontal axis of rotation, the first hinge member being rigidly connected to the first articulated lever and the second hinge member being rigidly connected to the second articulated lever, wherein the first articulated lever is coupled to the seat frame and the second articulated lever is capable of being coupled to the support region, wherein the first horizontal pivot rotates about the horizontal tilt axis in response to the tilting movement of the back rest, and wherein the forward portion of the seat frame is capable of being coupled to the motor vehicle body such that the height and longitudinal position of the seat frame are adjustable, and the first horizontal pivot is also adjustable in height and longitudinal position.

10. A motor vehicle seat comprising:

a seat frame;

a back rest having a forward portion and a rear portion, wherein the back rest is pivotably coupled to the seat frame about a first horizontal pivot;

a tilt adjustment device for tilting the back rest about a horizontal tilt axis, wherein the horizontal tilt axis is located at a height greater than the first horizontal pivot, and the tilt adjustment device has a first hinge portion secured relative to the back rest and a second hinge portion that is capable of being connected to a motor vehicle body; and a connecting linkage that is adjustable in length for coupling a forward portion of the seat frame to a support region that is fixed relative to the motor vehicle body, wherein the connecting linkage is adjustable in length, and the linkage comprises an adjustable length articulated lever, one end of which is coupled to the forward portion of the seat frame and the other of which is capable of being coupled to said support region, wherein the first horizontal pivot rotates about the horizontal tilt axis in response to the tilting movement of the back rest, and wherein the forward portion of the seat frame is capable of being coupled to the motor vehicle body such that the height and longitudinal position of the seat frame are adjustable, and the first horizontal pivot is also adjustable in height and longitudinal position.

* * * * *